H. W. Dopp,
Seal Lock.
Nº 51,434. Patented Dec. 12, 1865.
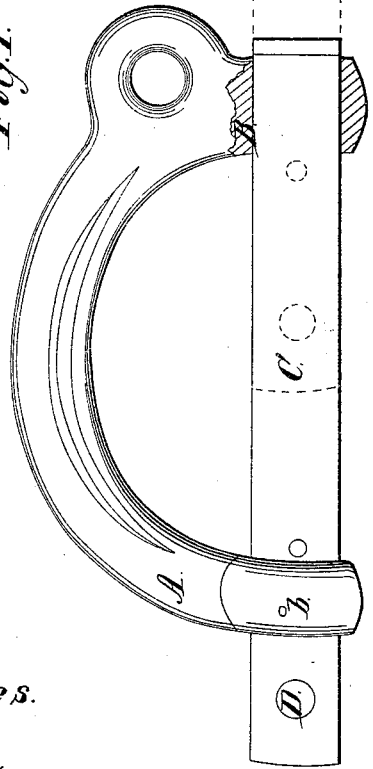
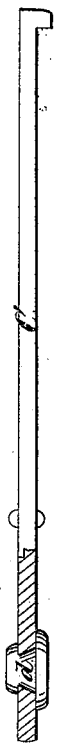
Witnesses.
W. O. White
J. Forsyth
Inventor.
H. Wm. Dopp

UNITED STATES PATENT OFFICE.

H. W. DOPP, OF BUFFALO, NEW YORK.

SEAL-LOCK.

Specification forming part of Letters Patent No. 51,434, dated December 12, 1865.

*To all whom it may concern:*

Be it known that I, H. W. DOPP, of the city of Buffalo, county of Erie, State of New York, have invented a new Improved Seal-Lock; and I do hereby declare that the following is a full and exact description thereof, reference being had to the accompanying drawings, and to the letters of reference marked thereon.

Figure I represents a side view of the model. Fig. II represents a section of bow A. Fig. III represents a section of bolt C.

A is a bow having slot-holes B $b$ at its ends, one hole on each end.

B $b$ are two slot-holes through the ends of bow A, for the purpose of securing a lock-bolt to bow.

C is a lock-bolt, secured to bow A by means of slot-holes B $b$, for the purpose of making, in combination with bow A, a lock. The bolt C is movable, and might be drawn out of the hole $b$, so as to open the bow and permit the same to pass through the hasp of a door, and then moved in and through the hole $b$ again, so as to form a lock.

D is a hole through the flat side of bolt C, at or near the end, which is designed to receive a soft-metal seal after the bolt is moved in through hole $b$. The object in attaching this soft-metal seal, as shown in Fig. III, is to prevent the opening of the lock without first removing the seal. This lock is not intended to prevent stealing, but to seal up goods, rooms, railroad-cars, &c., as such is used for custom-house purposes in various countries.

To use this lock, the bolt C is to be withdrawn out of slot-hole $b$. The bow A is then passed through the hasp of a door, trunk, box, or straps, as the case may be. The bolt C is then moved back in its former position, and a soft metallic seal is inserted into hole D, which may be compressed so as to form a fastening.

To open the lock, the soft metallic seal is first to be removed, and the bolt C then withdrawn out of slot-hole $b$.

I claim—

The combination of bow A, slot-holes B $b$, and bolt C, together with soft metallic seal $d$, as and for the purpose described.

H. WM. DOPP.

Witnesses:
    I. FORSYTH,
    W. O. WHITE.